United States Patent
Stadtlander

(10) Patent No.: US 7,857,026 B2
(45) Date of Patent: Dec. 28, 2010

(54) METHOD FOR REPAIRING LOOSE MOLDED-IN BUSHINGS

(75) Inventor: Daniel M. Stadtlander, West Hartford, CT (US)

(73) Assignee: United Technologies Corporation, Hartford, CT (US)

(*) Notice: Subject to any disclaimer, the term of this patent is extended or adjusted under 35 U.S.C. 154(b) by 74 days.

(21) Appl. No.: 11/232,665

(22) Filed: Sep. 22, 2005

(65) Prior Publication Data

US 2006/0011301 A1    Jan. 19, 2006

Related U.S. Application Data

(62) Division of application No. 10/188,566, filed on Jul. 2, 2002, now Pat. No. 7,070,673.

(51) Int. Cl.
*B29C 65/54* (2006.01)
*B29C 73/26* (2006.01)

(52) U.S. Cl. ...................... 156/382; 156/579

(58) Field of Classification Search ............... 156/91, 156/92, 94, 98, 285, 286, 293, 382, 579; 29/402.01, 402.02, 402.18; 52/309.2, 309.16, 52/366, 787.12, 787.11, 787.1
See application file for complete search history.

(56) References Cited

U.S. PATENT DOCUMENTS

| | | | | |
|---|---|---|---|---|
| 4,208,229 A * | 6/1980 | Giardini | ...................... | 156/94 |
| 4,755,904 A * | 7/1988 | Brick | ......................... | 361/117 |
| 4,812,193 A * | 3/1989 | Gauron | ........................ | 156/293 |
| 5,240,543 A * | 8/1993 | Fetterhoff et al. | ............ | 156/293 |
| 6,302,987 B1 * | 10/2001 | Wojnarowski et al. | ...... | 156/151 |
| 6,561,247 B2 * | 5/2003 | Chou et al. | ................. | 156/382 |

* cited by examiner

*Primary Examiner*—Michael A Tolin
(74) *Attorney, Agent, or Firm*—Bachman & LaPointe, P.C.

(57) ABSTRACT

The present invention relates to a method for bonding a component, such as a bushing, into a part, such as a panel. The method broadly comprises attaching a vacuum chamber to a surface of the part, seating the component into a slot in the part, and applying an adhesive material about a circumference of the component while drawing a vacuum in the vacuum chamber to allow the adhesive material to flow between the part and the component.

8 Claims, 1 Drawing Sheet

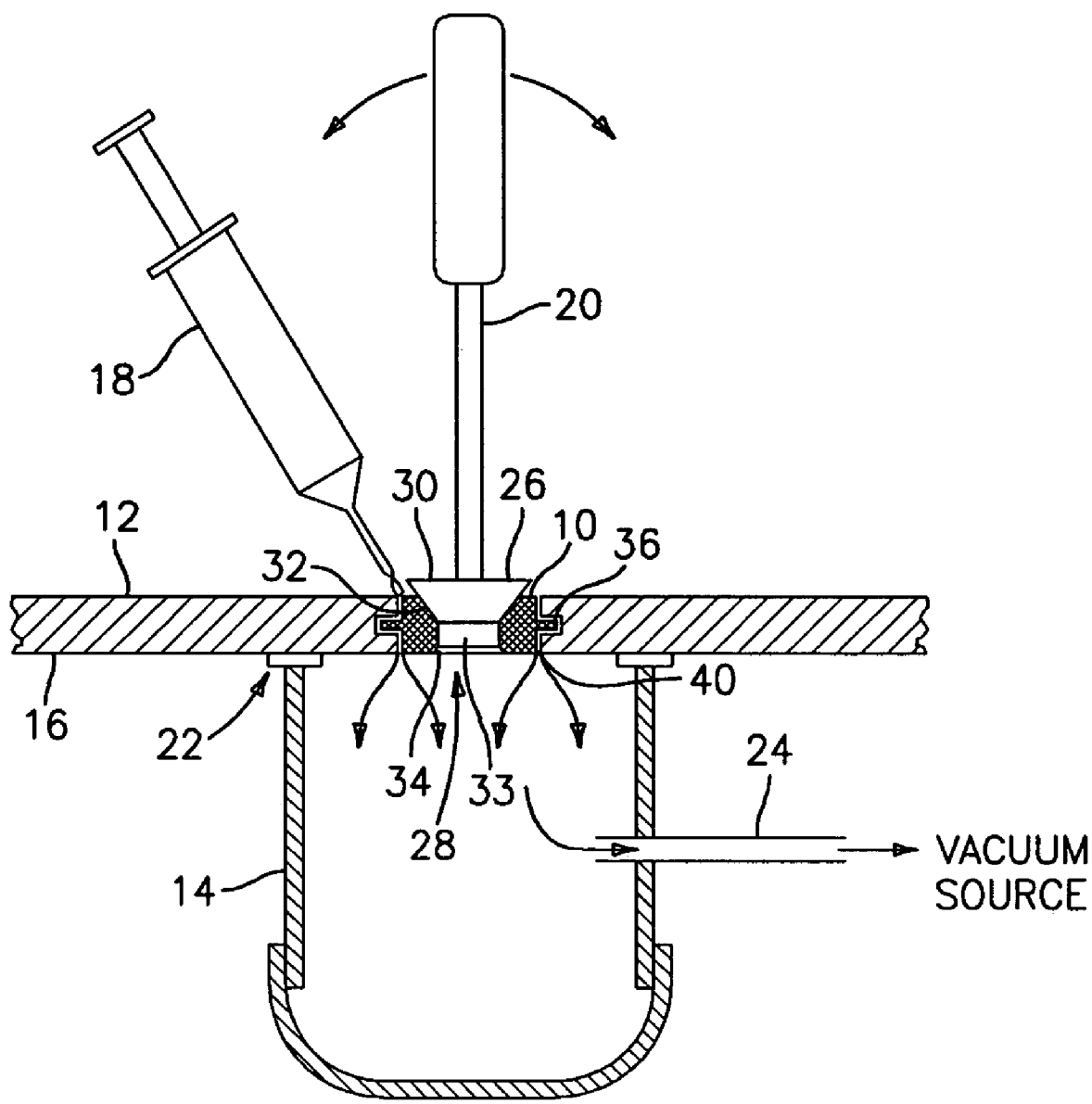

METHOD FOR REPAIRING LOOSE MOLDED-IN BUSHINGS

CROSS-REFERENCE TO RELATED APPLICATION(S)

This application is a divisional application of U.S. patent application Ser. No. 10/188,566, filed Jul. 2, 2002, entitled METHOD FOR REPAIRING LOOSE MOLDED-IN BUSHINGS, By Daniel M. Stadtlander, now U.S. Pat. No. 7,070,673.

BACKGROUND OF THE INVENTION

The present invention relates to a method for re-bonding a component, such as a bushing, which is mechanically locked into a part, such as a panel.

Components, such as bushings, molded into a part, such as a composite panel, come loose as a result of wear and vibration during service and need to be re-bonded into position. Previous repair techniques for performing such re-bonding involve either a staking of the component or drilling injection holes. One of the great difficulties with these previous repair techniques is trying to get a proper flow of the adhesive material used to re-bond the component.

Thus, there remains a need for a repair technique which effectively re-bonds a loosened component into place.

SUMMARY OF THE INVENTION

Accordingly, it is an object of the present invention to provide a method for re-bonding a component into a part.

It is a further object of the present invention to provide a method as above which obtains a proper flow of the adhesive material used to bond the component.

The foregoing objects are attained by the method of the present invention.

In accordance with the present invention, a method for re-bonding a component into a part is provided. The method broadly comprises attaching a vacuum chamber to a surface of the part and applying an adhesive material about a circumference of the component while drawing a vacuum in the vacuum chamber to allow the adhesive material to flow between the part and the component.

A system for performing the method of the present invention is also disclosed.

Other details of the method of the present invention, as well as other objects and advantages attendant thereto, are set forth in the following detailed description and the accompanying drawing wherein like reference numerals depict like elements.

BRIEF DESCRIPTION OF THE DRAWING

The FIGURE illustrates a system for bonding a component into a part.

DETAILED DESCRIPTION OF THE PREFERRED EMBODIMENT(S)

Referring now to the FIGURE, a system for re-bonding a component 10, such as a bushing, which is mechanically locked into in a slot in a part 12, such as a panel, is illustrated. The system includes a vacuum chamber 14 secured to a surface 16 of the part 12, a means 18 for depositing an adhesive all around the circumference of the component 10 to be rebonded, and a manually operable tool 20 whose function will be described hereinafter.

The vacuum chamber 14 may be locally manufactured from a polyvinylchloride pipe with an end cap or from any other suitable vessel known in the art. The vacuum chamber may be secured to the surface 16 by any suitable means known in the art, such as by a sealant tape 22. The vacuum chamber 14 may be connected to a vacuum source (not shown) via a conduit 24.

The manually operable tool 20 is used for two purposes. One to seal the inside of the bushing against leakage and Two to rock the bushing to break the seal between the bushing flange 36 and the panel 12. As can be seen from the FIGURE, the tool 20 has an end portion 26 which conforms to the shape of an opening 28 in the component 10. For example, the end portion 26 may have a conical portion 30 for engaging conical surfaces 32 in the opening 28 and a cylindrical tip portion 33 for engaging a cylindrical portion 34 in the opening 28. As shown in the FIGURE, the tool 20 may be rocked from side to side to break any seal between the part 12 and a flange 36 which surrounds the component 10. This allows an adhesive material to better flow between the component 10 and the part 12. The tool 20 also serves to plug the opening 28 while a vacuum is being applied to the chamber 14.

The adhesive depositing means 18 may comprise any suitable means known in the art for applying an adhesive material between the component 10 and the part 12. Preferably, the adhesive depositing means 18 comprises a syringe.

The bonding method of the present invention may be performed by first cleaning the surface area around the component 10. Any suitable technique known in the art may be used to perform the cleaning step. Following cleaning, the component 10 and the part 12 are allowed to air dry. While the component 10 and the part 12 are drying, an adhesive system for securing the component 10 to the part 12 may be prepared. The adhesive system may be any suitable adhesive material known in the art such as a 2 part liquid epoxy resin. If desired, the mixed adhesive may be diluted with a suitable solvent to reduce viscosity. As previously mentioned, the vacuum chamber 14 may be locally manufactured and attached to the back side of the part 12 using a sealant material such as sealant tape 22. Once the vacuum chamber has been manufactured, the tool 20 may be used to plug the opening 28 in the component 10.

Thereafter, a vacuum may be drawn, typically 25 inches Hg minimum. While the vacuum is drawn, the mixed adhesive material is injected into the gap 40 around the component 10. The adhesive material is injected until it starts to appear out of the back side of the part 12. Then, the vacuum source and the plug tool 20 are removed and the adhesive material is allowed to cure per the adhesive manufacturer's recommended cure time and temperature. One of the advantages to the method of the present invention is that the adhesive material may be applied more completely around the component 10 to be bonded into the part 12 as a result of the vacuum application. Further, the method of the present invention is easy to perform and does not require expensive equipment.

The method of the present invention has particular utility in re-bonding of bushings that are mechanically locked in place at the time of original manufacture and become loose during usage. Typical usage of this invention would include repairing front and rear liner panels of turbine engines, where the mounting bushings have become loose due to cyclical temperature variations and vibration.

It is apparent that there has been provided in accordance with the present invention a method for repairing loose molded-in bushings which fully satisfies the objects, means and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations which fall within the broad scope of the appended claims.

What is claimed is:

1. A system for bonding a bushing into a part comprising:
   means for applying an adhesive material to a gap surrounding said bushing, said adhesive material applying means being located adjacent a first surface of said part;
   said adhesive material applying means comprising a syringe containing an adhesive material;
   means for applying a vacuum to a side of said part while said adhesive material is being applied, said vacuum applying means being secured to a second surface of said part opposed to said first surface;
   means for engaging an opening having a first cylindrical portion with a sidewall and a second portion with a diverging sidewall in said bushing and for sealing said opening during application of said vacuum by contacting both said sidewall of said first cylindrical portion and said diverging sidewall of said second portion; and
   said engaging means further comprising means for moving said bushing relative to said part to break a seal between a portion of said bushing and said part.

2. A system according to claim 1, wherein said vacuum applying means comprises a vacuum chamber attached to said side of said part.

3. A system according to claim 2, wherein said vacuum chamber is locally manufactured from a polyvinylchloride pipe having an end cap.

4. A system according to claim 2, further comprising a sealant tape for securing said vacuum chamber to said part side.

5. A system according to claim 1, wherein said bushing is positioned within an aperture in said part which extends from said first surface to said second surface.

6. A system according to claim 5, wherein said part comprises a front liner panel of a turbine engine and said system comprises said bushing being positioned in said aperture in said front liner panel.

7. A system according to claim 5, wherein said part comprises a rear liner panel of a turbine engine and said system comprises said bushing being positioned in said aperture in said rear liner panel.

8. A system for bonding a bushing into a part comprising:
   means for applying an adhesive material to a gap surrounding said bushing adjacent a first surface of said part, said adhesive material applying means being located adjacent said first surface of said part;
   said adhesive material applying means comprising a syringe containing an adhesive material;
   means for applying a vacuum to a side of said part while said adhesive material is being applied, said vacuum applying means being secured to a second surface of said part opposed to said first surface; and
   means for engaging an opening having a first cylindrical portion with a sidewall and a second portion having a conically shaped sidewall adjacent said first cylindrical portion in said bushing and for sealing said opening;
   said engaging means further comprising means for moving said bushing relative to said part to break a seal between a portion of said bushing and said part; and
   said opening engaging and component moving means comprising a manually operated tool having a handle at a first end, a cylindrical tip portion at a second end opposed to said first end for engaging said sidewall of said first cylindrical portion and for plugging said first cylindrical portion of said opening, and a conically shaped portion intermediate said first and second end for engaging and plugging said conically shaped second portion of said opening.

* * * * *